(12) United States Patent
Pajona et al.

(10) Patent No.: US 11,064,371 B2
(45) Date of Patent: *Jul. 13, 2021

(54) RECONFIGURABLE DYNAMIC MESH NETWORK

(71) Applicant: Ethertronics, Inc., San Diego, CA (US)

(72) Inventors: Olivier Pajona, Antibes (FR); Laurent Desclos, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,366

(22) Filed: Jul. 31, 2018

(65) Prior Publication Data
US 2018/0368008 A1    Dec. 20, 2018

Related U.S. Application Data

(63) Continuation of application No. 15/426,042, filed on Feb. 6, 2017, now Pat. No. 10,051,493.
(Continued)

(51) Int. Cl.
| | |
|---|---|
| *H04W 74/00* | (2009.01) |
| *H04W 24/02* | (2009.01) |
| *H04W 16/28* | (2009.01) |
| *H04W 16/26* | (2009.01) |
| *H04W 84/18* | (2009.01) |
| *H04W 84/12* | (2009.01) |

(52) U.S. Cl.
CPC .......... *H04W 24/02* (2013.01); *H04W 16/26* (2013.01); *H04W 16/28* (2013.01); *H04W 84/12* (2013.01); *H04W 84/18* (2013.01)

(58) Field of Classification Search
CPC ..... H04W 24/02; H04W 16/26; H04W 16/28; H04W 84/12; H04W 84/19; H01Q 9/00; H01Q 9/04; H01Q 3/34
See application file for complete search history.

(56) References Cited

U.S. PATENT DOCUMENTS 5,128,687 A * 7/1992 Fay ...................... H01Q 25/008
                                                        342/376
5,444,694 A    8/1995 Millet et al.
(Continued)

*Primary Examiner* — Stephen M D Agosta
(74) *Attorney, Agent, or Firm* — Dority & Manning, P.A.

(57) ABSTRACT

A network communication system includes three or more nodes that are wirelessly connected in a mesh configuration, forming a reconfigurable mesh network, to improve communication link performance. The reconfigurable mesh network can be dynamically adjusted to maintain and improve communication links throughout a region serviced by the mesh, or between a source and destination on the mesh network. Adaptive antenna system techniques are implemented in one or more of the nodes on the mesh network, such that multiple radiation pattern modes can be generated to dynamically adjust radiated performance between specific links along a selected path for communicating information on the mesh network. Antenna system metrics, such as signal to noise ratio, signal to interference plus noise ratio, and receive signal strength indicator are used to monitor and to adjust adaptive antenna system characteristics to optimize link performance between nodes on the mesh network.

7 Claims, 9 Drawing Sheets

Related U.S. Application Data

(60) Provisional application No. 62/291,432, filed on Feb. 4, 2016.

(56) References Cited

U.S. PATENT DOCUMENTS

| | | | | |
|---|---|---|---|---|
| 5,559,806 | A * | 9/1996 | Kurby | H04B 7/18517 370/325 |
| 5,610,617 | A * | 3/1997 | Gans | H01Q 3/24 342/148 |
| 5,621,752 | A * | 4/1997 | Antonio | H04B 1/7085 370/335 |
| 5,767,807 | A * | 6/1998 | Pritchett | H01Q 3/24 342/374 |
| 5,790,070 | A * | 8/1998 | Natarajan | H01Q 1/288 342/354 |
| 5,818,385 | A * | 10/1998 | Bartholomew | H01Q 1/246 342/372 |
| 5,890,067 | A * | 3/1999 | Chang | H04W 16/28 455/442 |
| 5,924,020 | A * | 7/1999 | Forssen | H01Q 25/00 342/373 |
| 5,936,577 | A * | 8/1999 | Shoki | H01Q 25/00 342/373 |
| 5,953,325 | A * | 9/1999 | Willars | H04B 7/0689 370/335 |
| 6,009,124 | A * | 12/1999 | Smith | H01Q 1/246 375/267 |
| 6,195,559 | B1 * | 2/2001 | Rapeli | H01Q 1/242 342/359 |
| 7,151,938 | B2 | 12/2006 | Weigand | |
| 7,996,034 | B1 * | 8/2011 | Yegnashankaran | H04W 64/006 455/550.1 |
| 8,116,247 | B2 | 2/2012 | Dixit et al. | |
| 8,346,273 | B2 | 1/2013 | Weigand | |
| 8,830,906 | B1 | 9/2014 | Shousterman | |
| 9,037,146 | B2 | 5/2015 | Weigand | |
| 9,301,087 | B1 * | 3/2016 | Pappas | H04W 52/0212 |
| 9,479,241 | B2 * | 10/2016 | Pabla | H04L 67/10 |
| 10,102,585 | B1 * | 10/2018 | Bryant | G06Q 40/08 |
| 2002/0119808 | A1 * | 8/2002 | Seiki | H01Q 3/24 455/575.5 |
| 2002/0151320 | A1 * | 10/2002 | Wasenius | H04M 1/72513 455/518 |
| 2003/0032457 | A1 * | 2/2003 | Leung | G08B 6/00 455/567 |
| 2005/0124346 | A1 | 6/2005 | Corbett | |
| 2005/0164664 | A1 | 7/2005 | DiFonzo | |
| 2006/0262737 | A1 * | 11/2006 | Livet | H04L 45/302 370/254 |
| 2008/0187067 | A1 | 8/2008 | Wang | |
| 2008/0192713 | A1 * | 8/2008 | Mighani | H04W 84/00 370/338 |
| 2008/0242414 | A1 * | 10/2008 | Rofougaran | A63F 13/235 463/39 |
| 2008/0248802 | A1 | 10/2008 | Krishnamoorthy | |
| 2010/0210289 | A1 | 8/2010 | Rooks | |
| 2013/0127670 | A1 * | 5/2013 | Desclos | H01Q 25/04 343/700 MS |
| 2015/0019342 | A1 * | 1/2015 | Gupta | G06Q 10/20 705/14.66 |
| 2015/0180120 | A1 | 6/2015 | Pietraski | |
| 2016/0360425 | A1 * | 12/2016 | Huang | H01Q 21/00 |

* cited by examiner

RECONFIGURABLE DYNAMIC MESH NETWORK

CROSS-REFERENCE TO RELATED APPLICATIONS

This application is a continuation of U.S. application Ser. No. 15/426,042, filed Feb. 6, 2017, which claims benefit of U.S. Provisional Ser. No. 62/291,432, filed Feb. 4, 2016. Applicant claims priority to and benefit of all such applications and incorporates all such applications herein by reference.

BACKGROUND

Field of the Invention

This invention relates generally to the field of wireless communication. In particular, the invention relates to a reconfigurable mesh network for improved communication system performance in WLAN and other multi-node communication platforms.

Description of the Related Art

Mobile communication systems continue to proliferate worldwide with cellular networks and wireless local area networks (WLAN) providing near ubiquitous coverage. WLAN has been adopted across homes and businesses in most regions of the world, with a large number of client devices such as smartphones, laptops, and tablets capable of WLAN reception. The current focus of IoT (Internet of Things) is to develop products for use in homes and businesses that provide connectivity for control and monitoring, with this connectivity often using WLAN or frequency bands used by WLAN. Some of these IoT in-home applications are critical, such as security monitoring and health monitoring, and require a continuously assessable communication link. More recently WLAN has been adopted for high throughput applications such as video streaming for in-building applications. These types of systems also require good performance from the RF radio and antenna system to ensure quality operation, and these systems increase the number of WLAN systems and RF signaling encountered in businesses, apartment buildings, and neighborhoods. The requirement for increased data rates to support a larger number of users and video applications has been met by a move toward higher orders of modulation in the transmitted signal as well as higher orders of multiple input multiple output (MIMO). These improvements in modulation technique place a requirement on improved signal to noise ratio (SNR) or signal to interference plus noise ratio (SINR) levels. Additionally, better control of the radiated field from the antenna system associated with the access point will be required to provide better communication link quality for an antenna system tasked to provide higher throughput and a more reliable link.

Implementation of mesh network techniques provides a method for improving communication link performance and reliability for networks. A mesh network is a network topology in which each node relays data for the network. All mesh nodes, or a subset of nodes, cooperate in the distribution of data within the network. A mesh network can provide improved reliability and offers redundant links for the portions comprising the network. When one node can no longer operate, the rest of the nodes can still communicate with each other, directly or through one or more intermediate nodes. Wireless mesh networks can self-form and self-heal, with the self-healing feature providing a dynamic method of compensating for faulty devices in a network. Mesh networks can relay messages using either a flooding technique or a routing technique, depending on the protocol and intended application of the communication network.

A rudimentary mesh network topology is one that incorporates repeaters for extending range of the network. Repeater circuits are commonly used in cellular and WLAN communication systems to improve range and to minimize dropped connections due to multi-path. A repeater works by receiving a signal from a communication node and re-transmitting the signal on the same frequency channel or a second frequency channel. With a repeater positioned at a distance from the communication node that represents 75 to 80 percent of the maximum range for communication, and with the repeater utilizing the same transmit power and antenna gain then a near doubling of range can be achieved for an equivalent propagation channel. The area or volume that a communication system provides coverage for can be increased by installing one or multiple repeaters that work in conjunction with the communication node. A wireless repeater circuit does not need a cabled connection to a communication node, easing the installation of repeaters in a communication system.

A mesh network can be used to provide more reliable communication links between nodes in a network, but like a non-mesh network, the communication links are dependent on the performance of the antenna systems on each side of the communication link. Passive antennas, which are typically used in commercial communication systems have fixed radiation patterns and fixed polarization states. Also, for mobile wireless applications such as cellular and WLAN, one end of the communication link can be moving, with this lack of control or knowledge as to location or orientation of the mobile communication device resulting in the need for a broad beamwidth or omni-directional radiation pattern to provide a consistent connection between nodes.

SUMMARY

Herein is disclosed a method for dynamically adjusting the radiation characteristics of the antenna systems in one or more nodes of a network communication system, or "mesh network", to provide the capability of compensating for movement of one or both nodes as well as compensate for changes in the propagation channel such as blockage caused by objects or personnel, and systems which implement such.

DETAILED DESCRIPTION OF THE PREFERRED EMBODIMENTS

Figure 1A:
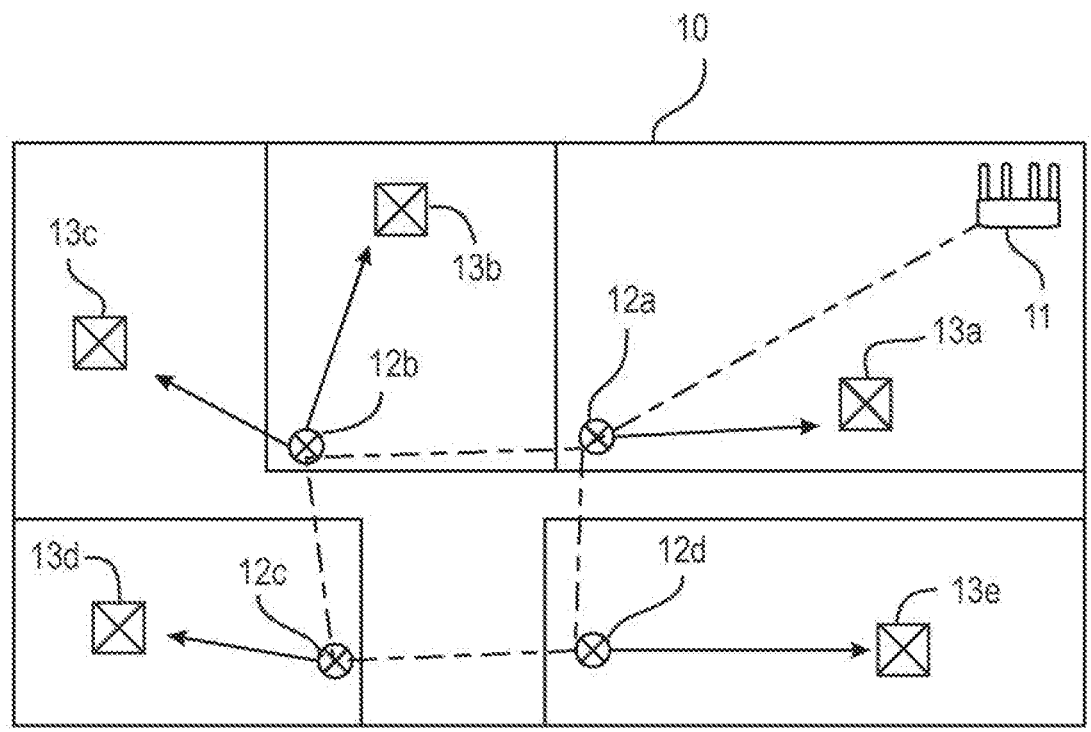
FIG. 1A shows a network communication system formed from a plurality of nodes, the nodes including a primary router, four repeaters, and five unique client devices; wherein each of the client devices is connected to one of the repeaters in a static mesh configuration.

Commonly owned U.S. Pat. Nos. 7,911,402; 8,362,962; 8,648,962; 9,240,634, and U.S. Pub. 20016/0099501 describe a beam steering technique wherein a single antenna is capable of generating multiple radiating modes. This is effectuated with the use of offset parasitic elements that alter the current distribution on the driven antenna as the reactive load on the parasitic is varied. This beam steering technique where multiple modes are generated is a modal antenna technique, and an antenna configured to alter radiating modes in this fashion will be referred to here as a modal antenna. This antenna architecture solves the problem associated with a lack of volume in mobile devices and small commercial communication devices to accommodate antenna arrays needed to implement more traditional beam steering hardware.

This modal antenna technique can be implemented in access points and client devices in WLAN systems and used to improve communication link performance for these networks. On the access point side of the link when multi-user operation is required the capability of optimizing the radiation pattern of the antennas in access point will be key to optimize link performance. Compared to a passive antenna used with an access point, the modal antenna can provide improved antenna gain performance in the direction of client devices by sampling the multiple radiation modes of the modal antenna and selecting the mode that provides improved system gain per client. The increased antenna system gain from the modal antenna will translate into an increase in signal to noise ratio (SNR) which in turn will translate into a higher order modulation scheme that can be supported for higher data throughput.

The following describes a reconfigurable mesh network that will provide improved communication link performance over current mesh network topologies.

As disclosed herein, a reconfigurable mesh network provides improved communication link performance in WLAN and other multi-node communication systems. The reconfigurable mesh network can be dynamically adjusted to maintain and improve communication links throughout a region serviced by the mesh. Adaptive antenna system techniques are implemented where multiple radiation modes can be generated to dynamically adjust radiated performance for specific links. System capacity and load balancing can be improved by the use of adaptive antenna modes on nodes as specific communication links are formed. System metrics such as signal to noise ratio (SNR), signal to interference and noise ratio (SINR), and receive signal sensitivity indicator (RSSI) are used to monitor and to adjust adaptive antenna system characteristics to optimize mesh performance.

In one embodiment, a communication system comprised of three nodes, with each node containing a transceiver and antenna system is used to provide wireless communication in a defined region. An example of this type of system is a WLAN system consisting of one access point to provide wireless coverage in-building to a first client and a second client. The client devices can be smartphones, Tablets, or laptops capable of operating on the WLAN frequency band that the access point operates on. The access point in the system along with both clients contains an adaptive antenna system with this adaptive antenna system defined as an antenna capable of generating multiple radiation modes. Each radiation mode of the adaptive antenna system has a radiation pattern associated with it, with these radiation patterns varying between the modes in terms of radiation pattern shape and/or polarization properties. A candidate antenna for the adaptive antenna is a modal antenna, with the modal antenna being capable of generating multiple radiation patterns from a single port antenna. A network controller is implemented to command and control the network comprised of the access point and two clients. An algorithm is resident in a computer in the network controller with this algorithm tasked to control the radiation modes of the adaptive antenna system in the access point and clients. The communication link quality between the access point and each client in the system is measured and stored in memory. Additionally, the communication link quality between the first client and the second client is measured and stored in memory. The algorithm implemented with the adaptive antenna provides the capability of surveying a channel quality indicator (CQI) metric such as Signal to Interference and Noise Ratio (SINR), Receive Signal Sensitivity Indicator (RSSI), Modulation Coding Scheme (MCS), or similar metric obtained from the baseband processor of the communication system to provide the capability to sample radiation patterns and make a decision in regards to operating on the optimal radiation pattern or mode based on the CQI for the communication link between the access point and client 1, the access point and client 2, and client 1 and client 2. If the access point provides the best communication link performance for clients 1 and 2, then this configuration is adopted and data is transmitted and received between the access point and both clients. If however, client 1 can provide a communication link to client 2 with better performance compared to the communication link generated between the access point and client 2, then the configuration will be adopted where the access point communicates with client 1 and client 1 communicates with client 2. The optimal communication link between each node in the three component system (access point, client 1, client 2) is determined when the radiation modes of the adaptive antenna systems associated with the access point and both clients are surveyed and the modes with the best communication link performance are selected and used for communication.

In another embodiment a repeater circuit (hereafter described as a repeater) is introduced to the communication system as previously described, with the repeater circuit positioned in the region to provide additional coverage and range as communication links are established among the nodes. The repeater consists of a transceiver and antenna system, with the antenna system being an adaptive antenna system as previously described. The algorithm and process as previously described is implemented wherein the radiation modes for the adaptive antenna systems in the communication system are surveyed as links are established across all pairings of nodes where communication links can be formed, the nodes being the access point, the first client, the second client, and the repeater. The node pairings that provide best communication link performance between access point and clients are selected and implemented.

In another embodiment, additional access points, repeaters, and/or additional clients are introduced into the communication system previously described. The algorithm and process as previously described is implemented wherein the radiation modes for the adaptive antenna systems in the communication system are surveyed as links are established across all pairings of nodes where communication links can be formed, the nodes being the access point, the first client, the second client, and the repeater. The node pairings that provide best communication link performance between access point and clients are selected and implemented.

In another embodiment, the antenna systems associated with one or multiple nodes are passive antennas with fixed radiation modes. The remaining antenna systems in the communication system are adaptive antenna systems as previously described. The algorithm and process as previously described is implemented wherein the radiation modes for the adaptive antenna systems in the communication system are surveyed as links are established across all pairings of nodes where communication links can be formed, the nodes being the access point, the first client, the second client, and the repeater. The node pairings that provide best communication link performance between access point and clients are selected and implemented.

In another embodiment the algorithm surveys and selects radiation modes as used in a mesh topology to maximize capacity of the communication system. The algorithm surveys modes of the adaptive antenna systems in the communication system for node pairings that can be established and communication links are formed such that capacity of the overall communication system is optimized. The algorithm takes into account multiple metrics such as type of data being transmitted between nodes, amount of data to be transmitted, available time slots, requested or provided to clients, as well as quality of communication links between nodes for the various radiation modes. The relevant information describing the mesh network performance can be stored in three matrices. The first matrix termed CHM provides information on data type, prior rate of data usage, and percentage of time used to service clients during previous data sessions for each client. The second matrix termed MatClient_C contains information for each client currently connected to an access point (AP) in the network with this information consisting of the CHM matrix along with a quality of service requirement (QosR) data describing a quality of service metric and SINR information for the various modes of the adaptive antenna systems. A third matrix termed MatClient_NC contains SINR or equivalent link quality data for all potentially connectable clients for the APs in the network. If multiple access points are in the communication system channel availability and allocation are considered in the decision making process.

In another embodiment the mesh network is organized using a level system. The number of level being the maximum number of node a signal must have to go through to connect a client to the network controller declared as level 0. Each AP or node of a certain level, consolidates its MatClient_NC, MatClient_C and data load with the MatClient_NC, MatClient_C and data load of the higher level AP connected to it, into consolidated matrixes that are sent to the node of lower level.

The network controller can therefore have an overview of the mesh and dynamically reconfigure the mesh, leveraging on each AP or client active steering capability In another embodiment each client that is part of the mesh network can become an AP.

In another embodiment the network controller can broadcast the consolidated MatClient_NC, MatClient_C and data load matrixes to all its node and clients, so the role of the network controller can be shared or transferred to a client or AP.

The algorithm described in the embodiments set forth above is configured to survey the radiation modes of all adaptive antenna systems in the network. The communication link quality between all adaptive antenna enabled access points and each client in the system is measured and stored in memory. The algorithm implemented with the adaptive antenna provides the capability of surveying a channel quality indicator (CQI) metric such as SINR (Signal to Interference and Noise Ratio), RSSI (Receive Signal Sensitivity Indicator), MCS (Modulation Coding Scheme), or similar metric obtained from the baseband processor of the communication system to provide the capability to sample radiation patterns and make a decision in regards to operating on the optimal radiation pattern or mode based on the CQI. The optimization can be performed to improve SINR of the communication links established between access points and clients in the network by selecting radiation modes for the adaptive antenna systems associated with access points and clients in the system.

Therefore, in various embodiments, a network communication system comprises:

three or more nodes wirelessly connected in a mesh configuration forming a communication network, wherein, within the mesh configuration, information is communicated from a source to a destination along a dynamically selected path between at least two of the three or more nodes over the communication network; a first node of the three or more nodes comprising an adaptive antenna system, the adaptive antenna system being capable of dynamically adjusting a radiation pattern thereof by periodically implementing one or another of a plurality of possible antenna radiation pattern modes as an implemented mode, at any instant in time, wherein the adaptive antenna system exhibits a distinct radiation pattern shape or polarization when configured in each of the plurality of possible antenna radiation pattern modes; and a controller, the controller comprising: a processor, a memory cell configured to store communication data, and an algorithm, wherein the processor is programmed to implement the algorithm for: accessing the communication data stored in the memory cell, determining from the communication data an optimal radiation pattern mode of the adaptive antenna system, and sending control signals to the adaptive antenna system for implementing the optimal radiation pattern mode as the implemented mode;

wherein the network communication system is configured to optimize communication of the information over the network by: selecting an optimal path between the nodes for communicating the information between the source and the destination, and implementing a radiation pattern mode of the adaptive antenna system for optimizing quality of service (QOS) between the first node containing the adaptive antenna system and another of the three or more nodes wirelessly connected therewith.

At least one of the three or more nodes may comprise an access point. At least one of the three or more nodes may comprise a repeater. At least one of the three or more nodes may comprise a client device, wherein the client device is selected from: a cell phone, tablet, laptop PC, or desktop PC. At least one of the three or more nodes may comprise an IoT device, wherein the IoT device comprises a domestic appliance configured to be controlled over the network.

In addition to the first node comprising an adaptive antenna system, a second node of the three or more nodes may also comprise an adaptive antenna system. The controller can be configured to control the implemented mode of each of the adaptive antenna systems of the first and second nodes. In some embodiments, each of the three or more nodes may comprise an adaptive antenna system.

In some embodiments, at least one of the three or more nodes comprises a passive antenna system, the passive antenna system consisting of a single radiation pattern mode, wherein the passive antenna system exhibits a fixed antenna radiation pattern shape and polarization.

The processor can be further configured to periodically repeat the algorithm for determining the optimal radiation pattern mode and implementing such as the implemented mode of the adaptive antenna system.

The quality of service (QOS) can be determined by a channel quality indicator (CQI) stored in the communication data. The CQI may comprise: receive signal strength indicator (RSSI), signal to noise ratio (SNR), signal to interference plus noise ratio (SINR), modulation coding scheme (MCS), or a combination thereof.

The controller can be physically contained in one of the three or more nodes. Alternatively, the controller can be contained in one of the first and second nodes. Still further, the controller can be contained in a combination of two or more of the nodes; for example, the memory cell in the first node can be utilized by a processor in the second node, the combination of which forming the controller.

The controller can be adapted to survey communication data in real time, and reconfigure the implemented mode associated with each of the adaptive antenna systems of the first and second nodes to optimize QOS across the communication network.

In various embodiments, the communication data can comprise: node indicia, antenna system indicia, antenna mode indicia, antenna mode configuration data, channel quality indicator measurement per antenna mode, or a combination thereof.

Now turning to the drawings, FIG. 1A shows a network communication system formed by a plurality of nodes which are wirelessly connected to form the network. The nodes include: a primary router 11, four repeaters 12a; 12b; 12c; and 12d, and five unique client devices 13a; 13b; 13c; 13d; and 13e; wherein each of the nodes is positioned in one of a plurality of rooms within a building. Each of the client devices 13(a-e) is connected to one of the repeaters 12(a-d) in a "static" mesh configuration. The illustrated mesh configuration is considered to be "static" because all the links between each node is fixed.

Figure 1B:
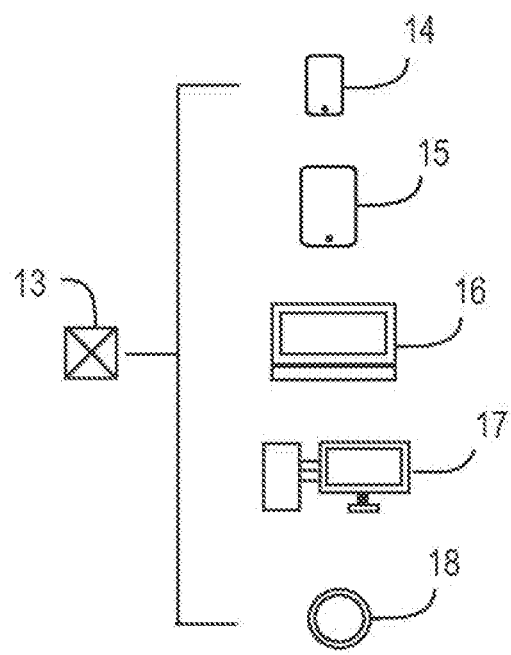
FIG. 1B shows that each of the client devices illustrated in FIG. 1A may be individually selected from a cell phone, tablet, laptop PC, desktop PC, or IoT device.

FIG. 1B shows that each of the client devices illustrated in FIG. 1A may be individually selected from a cell phone, tablet, laptop PC, desktop PC, or IoT device.

Figure 2:
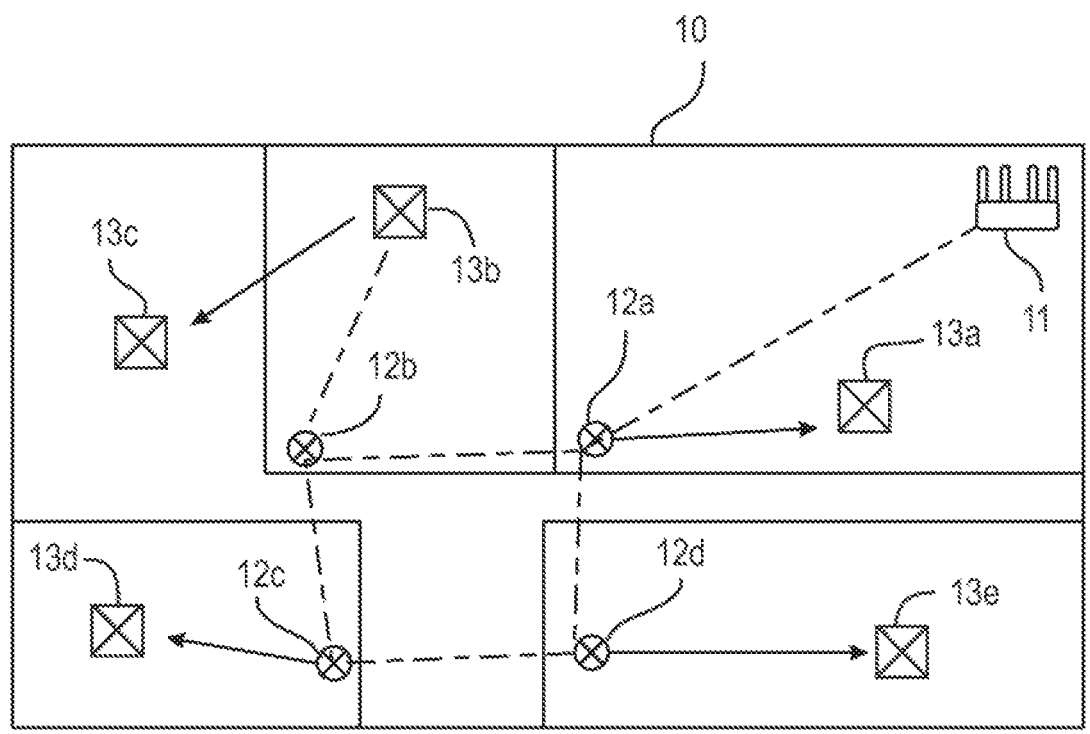
FIG. 2 illustrates a "dynamic" mesh network, where the mesh connections can be changed to accommodate better communication links that becomes available.

FIG. 2 shows the network communication system of FIG. 1A, wherein second client device 13b is dynamically reconfigured to establish a link with third client device 13c, such that either (i) third client device 13c receives improved communication performance, (ii) the overall network receives improved load balancing, or (iii) a combination thereof. FIG. 2 illustrates a "dynamic" mesh network, where the mesh connections can be changed to accommodate better communication links that become available. For example, when comparing that shown in FIG. 1A with the illustrated embodiment of FIG. 2, it can be appreciated that an analysis of the demand and load on the network suggests that third client device 13c would be better serviced by a communication link established with second client device 13b (which is further connected to second repeater 12b), and the load demanded by third client device 13c can be covered by the extra capacity of second client device 13b. Then, as second client device 13b is identified to be an accepted meshed mobile, second client device 13b will be reconfigured to service third client device with an improved RSSI and QOS. As time continues, the network monitors network demand and load, as well as nodes on the network, and determines if adjustments can be made to improve communication links between nodes, or balance the overall network.

It should be noted that the nodes of the mesh network do not require a repeater. For example, three or more nodes may form a network communication system, wherein each of the nodes is independently selected from: an access point, repeater, or client device; wherein the client device can be a cell phone, tablet, laptop PC, desktop PC, or internet of things (IoT) device. At least one access point is generally provided and is wired to an internet connection.

The mesh network may comprise one or more repeaters. Alternatively, the mesh network may comprise three client devices, or two client devices coupled to an access point. Any combination of three or more nodes may be arranged to form the network communication system (or "mesh network), wherein each of the nodes is independently selected from: an access point, repeater, or client device wherein the client device can be a cell phone, tablet, laptop PC, desktop PC, or internet of things (IoT) device.

The IoT device may comprise a domestic appliance, such as a thermostat, camera, refrigerator, electronic cooling appliance, or other appliance that is configured to be controlled over the network.

Figure 3:
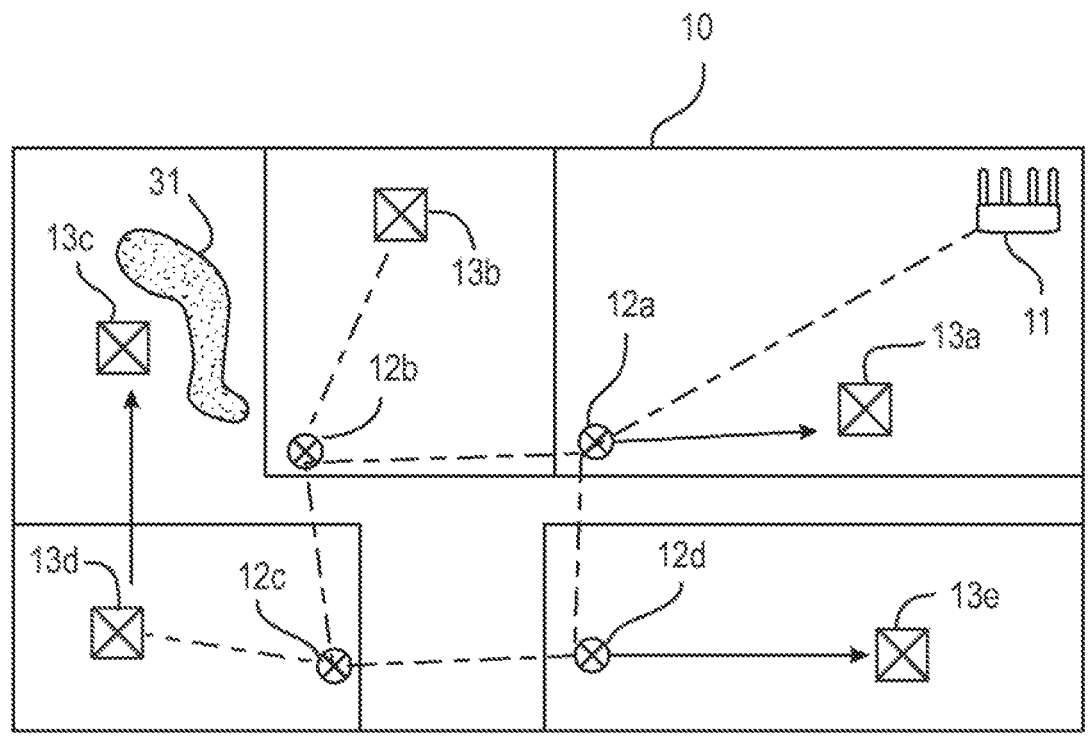
FIG. 3 further illustrates the dynamic mesh network described in FIG. 2 where a signal obstruction is introduced between two nodes and the mesh network is reconfigured to optimize network communication performance.

FIG. 3 further illustrates the dynamic mesh network described in FIG. 2 where a signal obstruction 31 is introduced between third client device 13c and second client device 13b. The signal obstruction may comprise one or more people, movement of furniture, or a myriad of other possible obstructions that might diminish signal quality between two nodes in the communication link. As suggested in FIG. 3, the obstruction 31 decreases the quality of the communication link between third client device 13c and second client device 13b. Accordingly, to provide improved communication with third client device 13c, the mesh is altered such that fourth client device 13d is tasked and reconfigured to communicate with third client device 13c.

It should be noted that a variation in the propagation channel between third client device 13c and second client device 13b requires a modification to the mesh network. As people move around indoors, furniture is moved, or otherwise an obstruction is introduced which interferes with signal quality between two nodes of the network, the mesh network identifies a potential QOS improvement and reconfigures the mesh network.

Figure 4A:
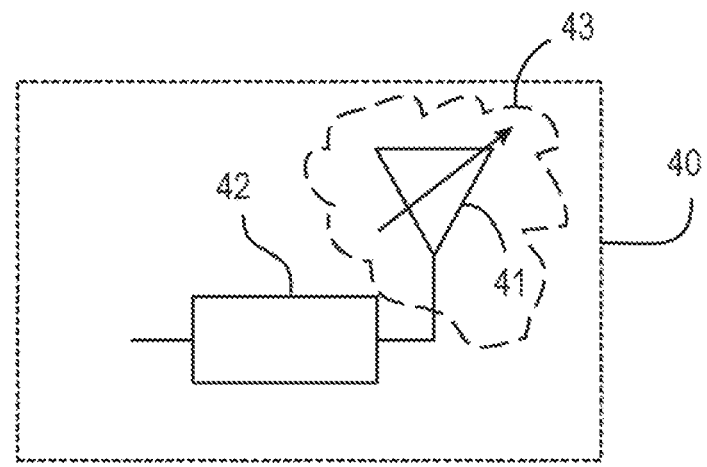
FIG. 4A illustrates an adaptive antenna system capable of dynamically adjusting a radiation pattern thereof; the adaptive antenna system includes a radiating element and an active component or circuit for implementing a mode of the antenna; wherein the antenna system excites a distinct radiation pattern corresponding to the implemented mode.

FIG. 4A illustrates an adaptive antenna system 40 capable of dynamically adjusting a radiation pattern 43 thereof by periodically implementing one or another of a plurality of possible antenna radiation pattern modes as the selected mode for the antenna system (the "implemented mode"), at any instant in time, wherein the adaptive antenna system exhibits a distinct radiation pattern shape or polarization when configured in each of the plurality of possible antenna radiation pattern modes.

Figure 4B:
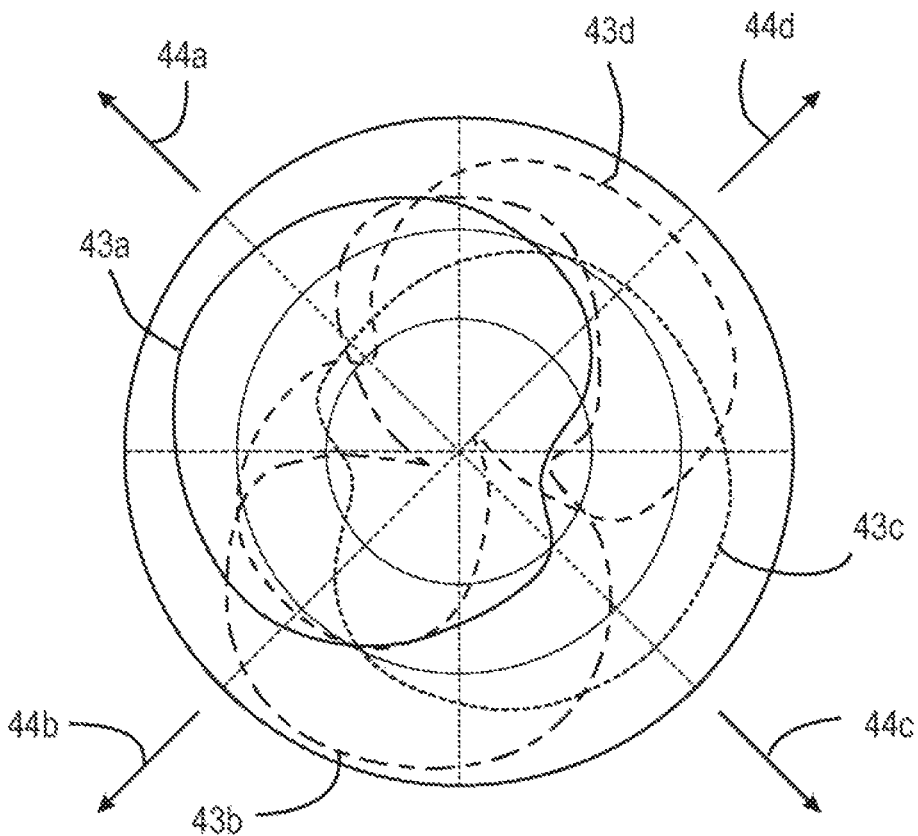
FIG. 4B shows a plot illustrating four distinct radiation patterns, each of the four radiation patterns has a distinct peak gain direction and is generated by the adaptive antenna system of FIG. 4A when the adaptive antenna system is configured in each of four modes.

FIG. 4B shows a plot illustrating four radiation pattern modes 44(a-d) and the corresponding peak gain coverage in four distinct different directions 44(a-d). Each of the antenna radiation patterns 43(a-d) represents a radiation pattern of the antenna system of FIG. 4A when configured in each of four modes thereof.

Adaptive antenna systems, also known as "modal antennas" or "multi-mode antennas", are known in the art and can be appreciated in the disclosure of commonly owned U.S. Pat. Nos. 7,911,402; 8,362,962; 8,648,962; 9,240,634, and U.S. Pub. 20016/0099501; the entire contents of each of which are hereby incorporated by reference. As reference is made to various embodiments for making and using adaptive antenna systems in the above-referenced patents and published patent application, a further discussion regarding the particulars of adaptive antenna systems is omitted herein.

An adaptive antenna system can be incorporated into one or more of the nodes. For example, an access point can comprise an adaptive antenna system therein. Alternatively, a repeater, a client device, or both a repeater and a client device can comprise an adaptive antenna system. Any number or combination of nodes, be them access points, repeaters, or client devices, may comprise an adaptive antenna system.

In various embodiments, at least one of the nodes does not contain an adaptive antenna system, but instead comprises a passive antenna system which is not capable of generating multiple modes and multiple corresponding radiation patterns having distinct shape and polarizations. The passive antenna system generally comprises a single fixed radiation pattern having a fixed size and polarization.

Figure 5A:
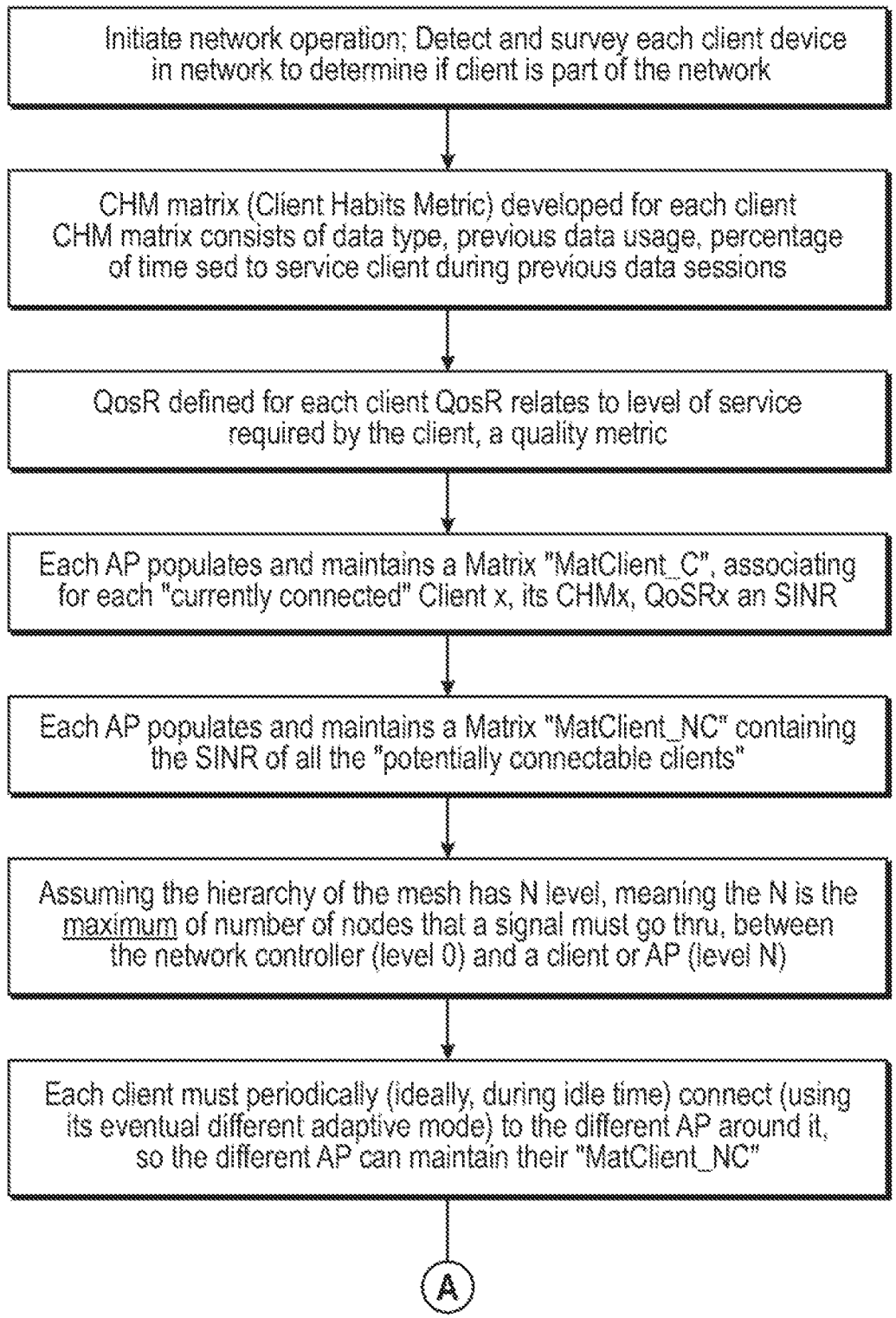
FIG. 5(A-B) show a method for load balancing of the network communication systems of FIGS. 2 and 3.
Figure 5B:
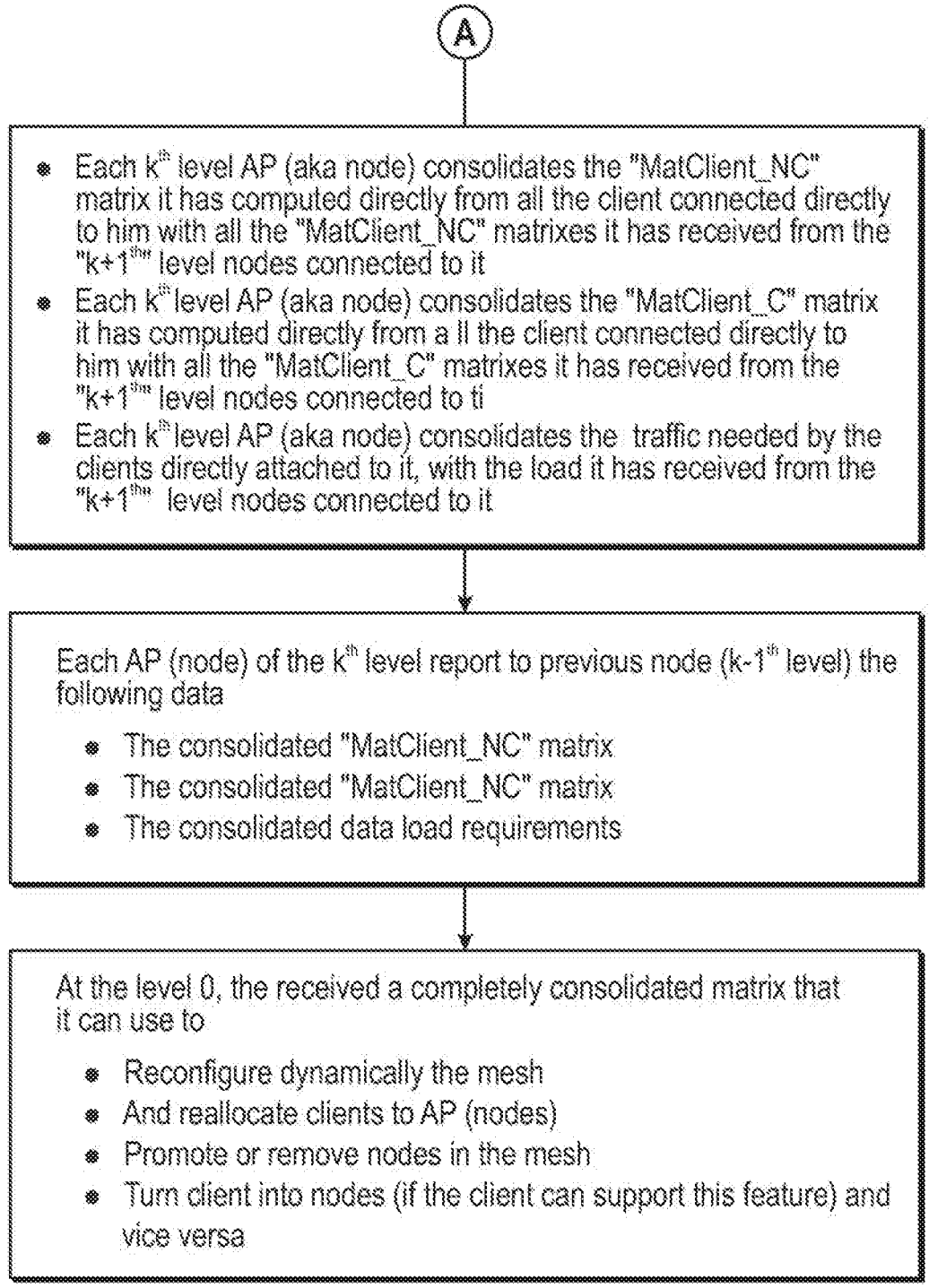

FIG. 5(A-B) illustrates a method for load balancing a mesh network, such as that provided by the network communication systems of FIGS. 2 and 3, wherein for each adaptive antenna system implemented in the various nodes of the network communication system, the radiation pattern modes are surveyed and used to load balance the mesh network. Certain steps setting forth an embodiment are illustrated in the referenced drawings and incorporated herein by reference.

Figure 6:
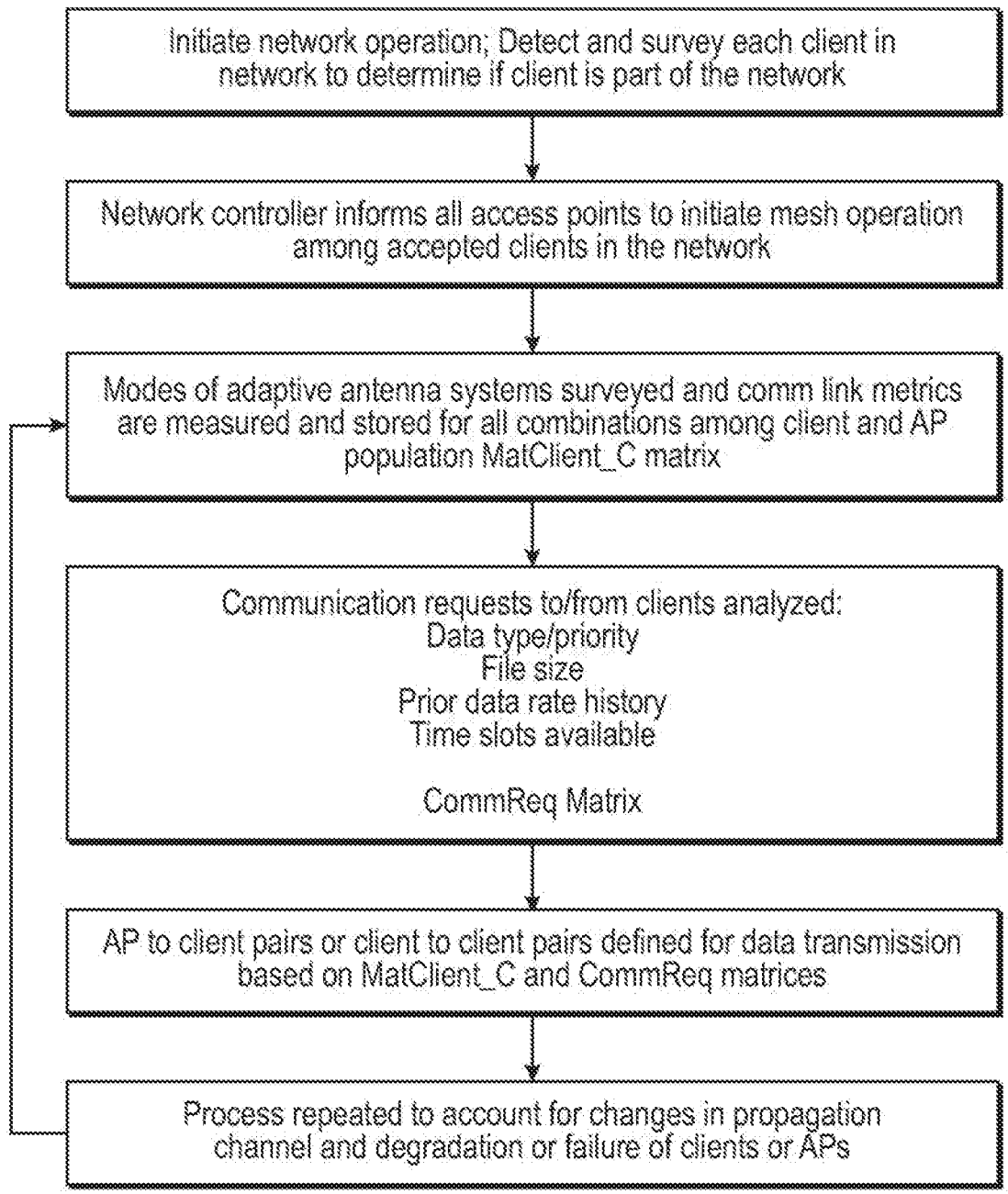
FIG. 6 illustrates a method for optimizing a mesh network comprising one or more nodes containing an adaptive antenna system.

FIG. 6 illustrates a method for optimizing a mesh network comprising one or more nodes containing an adaptive antenna system, the method, and steps thereof, in accordance with an embodiment, is illustrated in the referenced drawing and incorporated herein by reference.

Figure 7A:
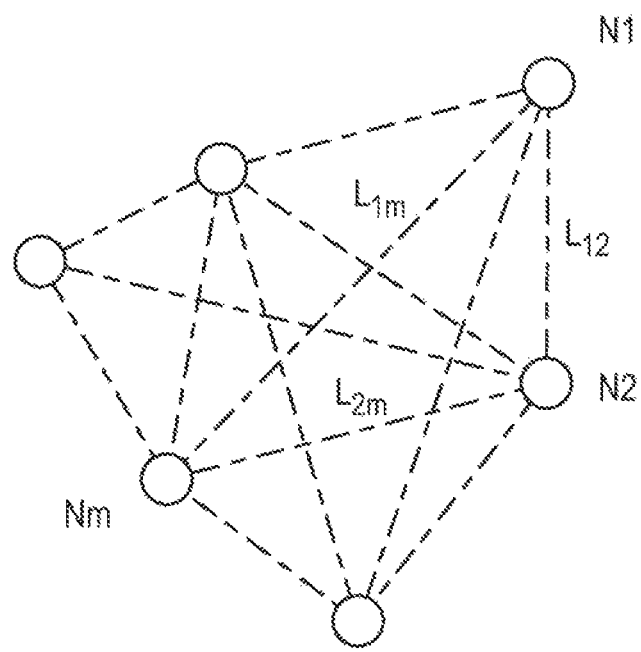
FIG. 7A illustrates a dynamic mesh network comprising six nodes.
Figure 7B:
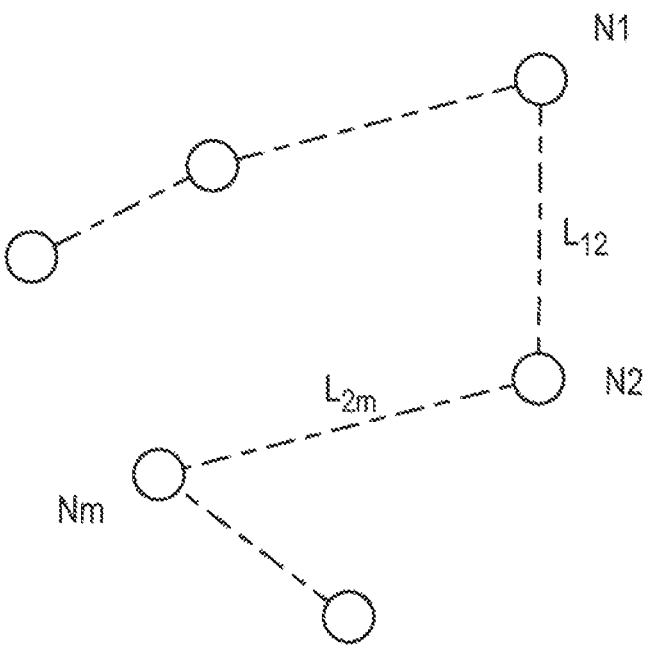
FIG. 7B shows the optimal path arrangement of the network communication system of FIG. 7A, which forms a "mesh network".

FIG. 7A illustrates a dynamic mesh network comprising six nodes, including a first node N1, a second N2, and an "$m^{th}$" node Nm, as shown. All possible links between the nodes are shown in broken lines, with a link between the first and second nodes labeled as L12, a link between the first and $m^{th}$ nodes labeled as L1m, and a link between the second and $m^{th}$ nodes labeled as L2m. The network communication system formed from the six nodes surveys all nodes and links between the nodes, dynamically selects a path between the six nodes for communicating information, and adjusts radiation patterns of the one or more adaptive antenna systems implemented in the nodes to optimize link quality between node pairs. After surveying all possible configurations, an optimal configuration is selected and the nodes are configured in the optimal path, while the radiation pattern modes are implemented that will provide optimal communication performance. FIG. 7B shows the optimal path arrangement of the network communication system of FIG. 7A, which forms a "mesh network". Note that the arrangement shown in FIG. 7B may change in time as bandwidth requirements, node positioning, interference characteristics, and other features vary; i.e. the network communication system again will survey and optimize the node path and radiation pattern modes of all adaptive antenna systems within the network.

Figure 8A:
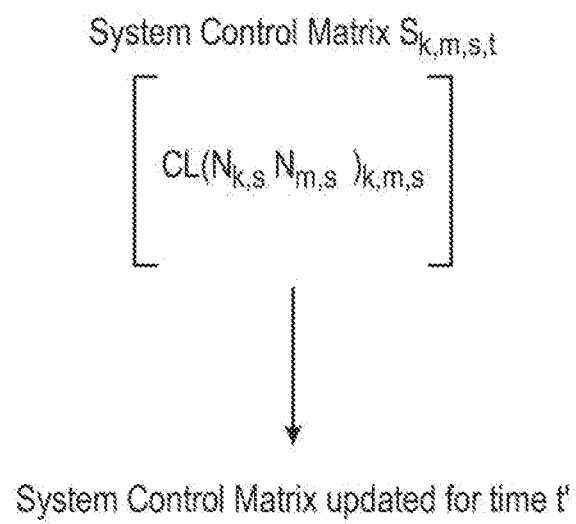
FIG. 8A illustrates the development and population of a System Control Matrix to assist in determining optimal node pairings when forming a mesh network.
Figure 8A:
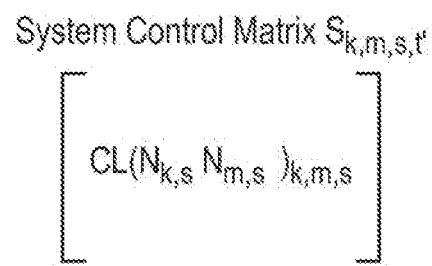
Figure 8B:
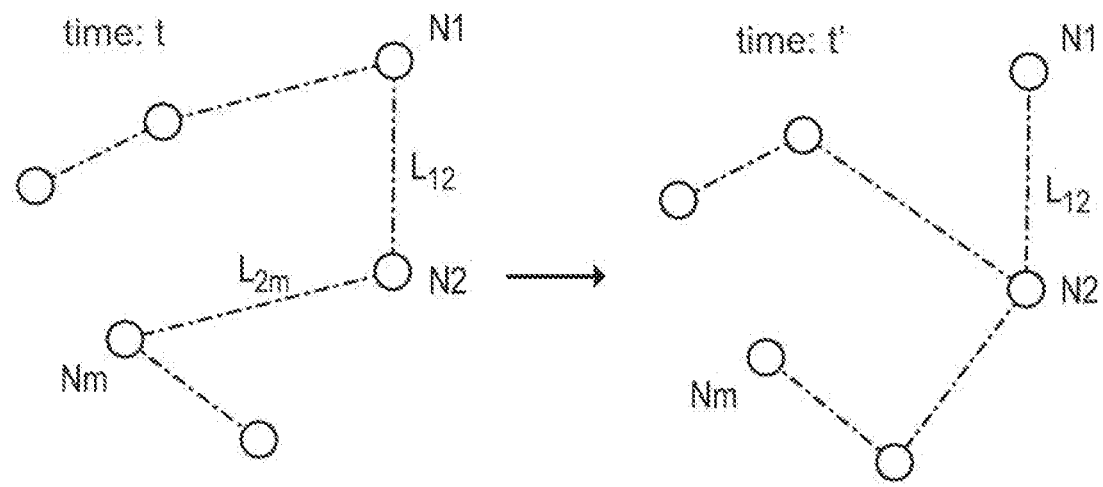
FIG. 8B shows a schematic representation of the change in mesh configuration of the six nodes in a network communication system or "mesh network", wherein the network is provided at time (t) and reconfigured at time (t').

FIG. 8A illustrates the development and population of a System Control Matrix to assist in determining optimal node pairings when forming a mesh network. A change in the propagation channel requires a change in communication links for the mesh to maintain optimal performance. Generalized system control matrix parameter CL refers to communication link and can be any metric that characterizes the communication link. CL(Nk,Nm)k,m defines the communication link between all nodes, for all system and antenna mode combinations. FIG. 8A shows a generalized process whereby the System Control Matrix is determined for a time (t), then at a subsequent time (t'), the System Control Matric is updated to optimize the mesh network at the time (t'). FIG. 8B shows a schematic representation of the change in mesh configuration of the six nodes in a network communication system or "mesh network", wherein the network is provided at time (t) and reconfigured at time (t') upon surveying nodes and antenna modes, determining the optimal configuration of node to node links and the path resulting therefrom, and determining the optimal configuration of adaptive antenna system modes within the nodes on the network.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be exercised from the combination, and the claimed combination may be directed to a sub-combination or a variation of a sub-combination.

What is claimed is:

1. A network communication system, comprising:
   a first node comprising an access point;
   a second node comprising a client device, wherein the client device comprises a cell phone, a tablet, a laptop computer, or a desktop computer;
   a third node wirelessly connected in a mesh configuration with the first node and second node, wherein at least one of the first node, the second node, and the third node comprises an adaptive antenna configured to operate in a plurality of radiation pattern modes, each of the plurality of radiation pattern modes associated with a different radiation pattern; and one or more control devices configured to perform operations, the operations comprising:
- configuring the adaptive antenna in the plurality of radiation pattern modes;
- adjusting operation of the adaptive antenna in the plurality of radiation pattern modes based on a quality of service metric associated with communication between at least two of the first node, second node, or third node;
- storing data transmission information in one or more matrices, the data transmission information comprising a type of data being transmitted between nodes, an amount of data being transmitted between nodes, or a type of data requested by or provided to the client device;
- communicating first data to at least the first node, the second node, and the third node, the first data indicative of a channel quality indicator for one or more client devices currently connected to the access point,
- communicating second data to at least the first node, the second node, and the third node, the second data indicative of a channel quality indicator for one or more client devices not currently connected to the access point;
- reconfiguring the adaptive antenna from operating in a first radiation pattern mode of the plurality of radiation pattern modes to operating in a second radiation pattern mode of the plurality of radiation pattern modes based at least in part on the data transmission information to establish a new communication link between the second node and the third node and to remove a communication link between the first node and the third node in the mesh; and
- determining whether at least one of the second node or the third node needs to be removed from the mesh configuration based, at least in part, on the first data and the second data.

2. The network communication system of claim 1, wherein the one or more control devices are further configured to select a communication path between at least two of the first node, second node, and third node.

3. The network communication system of claim 1, wherein the one or more control devices are configured to determine the quality of service metric based on a channel quality indicator.

4. The network communication system of claim 3, wherein the channel quality indicator comprises at least one of a receive signal strength indicator (RSSI), signal to noise ratio (SNR), a signal to interference plus noise ratio (SINR), or a modulation coding scheme (MCS).

5. The network communication system of claim 1, wherein the third node comprises an IoT device.

6. The network communication system of claim 5, wherein the IoT device comprises a domestic appliance.

7. The network communication system of claim 1, wherein at least one of the first node, second node, or third node comprises a modal antenna, the modal antenna comprising a radiating element and at least one parasitic element positioned adjacent to the radiating element.

* * * * *